(12) United States Patent  
Wu et al.

(10) Patent No.: US 8,677,111 B2  
(45) Date of Patent: Mar. 18, 2014

(54) BOOTING DEVICES USING VIRTUAL STORAGE ARRAYS OVER WIDE-AREA NETWORKS

(75) Inventors: David Tze-Si Wu, Fremont, CA (US); Steven McCanne, Berkeley, CA (US); Michael J. Demmer, San Francisco, CA (US); Nitin Gupta, Fremont, CA (US)

(73) Assignee: Riverbed Technology, Inc., San Francisco, CA (US)

( * ) Notice: Subject to any disclaimer, the term of this patent is extended or adjusted under 35 U.S.C. 154(b) by 435 days.

(21) Appl. No.: 13/166,321

(22) Filed: Jun. 22, 2011

(65) Prior Publication Data

US 2012/0030456 A1 Feb. 2, 2012

Related U.S. Application Data

(63) Continuation-in-part of application No. 12/978,056, filed on Dec. 23, 2010.

(60) Provisional application No. 61/330,956, filed on May 4, 2010.

(51) Int. Cl.  
*G06F 15/177* (2006.01)

(52) U.S. Cl.  
USPC ............... 713/2; 713/1; 709/217; 709/222; 711/100

(58) Field of Classification Search  
USPC .................... 713/1, 2; 709/217, 222; 711/100  
See application file for complete search history.

(56) References Cited

U.S. PATENT DOCUMENTS

| 7,231,430 | B2 * | 6/2007 | Brownell et al. ............. 709/218 |
| 7,925,829 | B1 | 4/2011 | Michael et al. |
| 8,024,442 | B1 | 9/2011 | Roussos et al. |
| 2008/0155169 | A1 | 6/2008 | Hiltgen et al. |
| 2008/0222375 | A1 | 9/2008 | Kotsovinos et al. |
| 2010/0070725 | A1 | 3/2010 | Prahlad et al. |
| 2011/0161649 | A1 * | 6/2011 | Bert ................................ 713/2 |

* cited by examiner

*Primary Examiner* — Thuan Du  
(74) *Attorney, Agent, or Firm* — Park, Vaughan, Fleming & Dowler LLP (57) ABSTRACT

Virtual storage arrays consolidate data storage at a data center for physical and virtual computer systems at one or more branch network locations. Standalone and virtualized computer systems at a branch network location load, execute, and store their operating systems, applications, and data using virtual storage arrays and do not require any built-in or external non-volatile data storage devices such as hard disk drives or solid-state drives at the branch network location. The virtual disks of the virtual storage array are mapped to physical data storage at the data center and accessed via a WAN using storage block-based protocols. A storage block cache at the branch network location includes storage blocks prefetched based on knowledge about the computer systems at the branch network location and the behavior of their operating systems and applications.

27 Claims, 6 Drawing Sheets

BOOTING DEVICES USING VIRTUAL STORAGE ARRAYS OVER WIDE-AREA NETWORKS

CROSS REFERENCE TO RELATED APPLICATIONS

This application is a continuation in part of U.S. patent application Ser. No. 12/978,056, entitled "Virtual Data Storage Devices and Applications Over Wide Area Networks, filed Dec. 23, 2010, which claims priority to U.S. Provisional Patent Application No. 61/330,956, filed May 4, 2010, and entitled "Branch Location Server Virtualization and Storage Consolidation," both of which are incorporated by reference herein for all purposes. This application is related to U.S. patent application Ser. No. 12/496,405, filed Jul. 1, 2009, and entitled "Defining Network Traffic Processing Flows Between Virtual Machines"; U.S. patent application Ser. No. 12/730,185, filed Mar. 23, 2010, and entitled "Virtualized Data Storage System Architecture"; and U.S. patent application Ser. No. 12/730,198, filed Mar. 23, 2010, and entitled "Virtualized Data Storage System Optimizations, all of which are incorporated by reference herein for all purposes.

BACKGROUND

The invention relates to the field of server virtualization and network storage. Computer system virtualization techniques allow one computer system, referred to as a host system, to execute virtual machines emulating other computer systems, referred to as guest systems. Typically, a host computer runs a hypervisor or other virtualization application. Using the hypervisor, the server computer may execute one or more instances of guest operating systems simultaneously on the single host computer. Each guest operating system runs as if it were a separate computer system running on physical computing hardware. The hypervisor presents a set of virtual computing resources to each of the guest operating systems in a way that multiplexes accesses to the underlying physical hardware of a single host computer.

One application of virtualization is to consolidate server computers within data centers. Using virtualization, multiple distinct physical server computers, each running its own set of application services, can be consolidated onto a single physical server computer running a hypervisor, where each server is mapped onto a virtual machine (VM) running on the hypervisor. In this approach, each VM is logically independent from the others and each may run a different operating system. Additionally, each VM is associated with one or more virtual storage devices, which are mapped to onto one or more files on a file server or one or more logical units (LUNs) on a storage area network (SAN).

Consolidation of server computers using virtualization reduces administrative complexity and costs because the problem of managing multiple physical servers with different operating systems and different file systems and disks is transformed into a problem of managing virtual servers on fewer physical servers with consolidated storage on fewer fileservers or SANs.

Large organizations, such as enterprises, are often geographically spread out over many separate locations, referred to as branches. For example, an enterprise may have offices or branches in New York, San Francisco, and India. Each branch location may include its own internal local area network (LAN) for exchanging data within the branch. Additionally, the branches may be connected via a wide area network (WAN), such as the internet, for exchanging data between branches.

Although virtualization allows for some consolidation of server computers and associated storage within a branch location, the latency, bandwidth, and reliability limitations of typical wide-area networks prevents the consolidation of many types of server computers and associated storage from multiple branch locations into a single location.

Because the WAN connecting branches is much slower than a typical LAN, storage access for clients and server applications at a branch location performing large or frequent data accesses via a WAN is unacceptably slow. Therefore, server and storage consolidation using prior virtualization techniques is unsuitable for these applications. For example, if a client or server application at a branch location frequently accesses large amounts of data from a database or file server, the latency and bandwidth limitations of accessing this data via the WAN makes this data access unacceptably slow. Therefore, system administrators must install and configure servers and data storage at the branch location that are accessible by a LAN, which is typically faster than a WAN by several orders of magnitude. This incurs additional equipment and administrative costs and complexity.

Additionally, WAN connections are often less reliable than a LAN. WAN unreliability can adversely affect the delivery of mission-critical services via the WAN. For example, an organization may include mission-critical operational services, such as user authentication (e.g., via Active Directory) or print services (e.g., Microsoft Windows Server Print Services). Prior server and storage virtualization is unsuitable for consolidating mission-critical operational services at a central location, such as a data center, because if the WAN connection is disabled or intermittently functioning, users can no longer access printers or log in to their computers.

Because of the performance limitations of WANs, organizations have previously been unable to consolidate time-critical, mission-critical, and/or data intensive servers and data storage from multiple branches into a single location, such as a data center. Installing and configuring, referred to as deploying, and maintaining file servers and data storage at a number of different branches is expensive and inefficient. Organizations often require on-site personnel at each branch to configure and upgrade each branch's data storage, and to manage data backups and data retention. The deployment of servers, data storage, and the local area network connecting the servers, data storage, and clients at new branches (or migrating existing branches to new locations) is complex and time-consuming. Additionally, organizations often purchase excess computing and storage capacity for each branch to allow for upgrades and growing data storage requirements. Because branches are serviced infrequently, due to their numbers and geographic dispersion, organizations often deploy enough computing and data storage at each branch to allow for months or years of growth. However, this excess computing and storage capacity often sits unused for months or years until it is needed, unnecessarily driving up costs.

Therefore, there is an unmet need for reducing the equipment and administrative costs and associated complexity of operating time-critical, mission-critical, and/or data intensive servers at branch locations. Additionally, there is an unmet need to reduce the time and complexity for deploying servers, data storage, and local area networks at new and relocated branch locations.

BRIEF DESCRIPTION OF THE DRAWINGS

The invention will be described with reference to the drawings, in which.

SUMMARY

In embodiments of the invention, standalone and virtualized computer systems at a branch network location load, execute, and store their operating systems, applications, and data using virtual storage arrays and do not require any built-in or external non-volatile data storage devices such as hard disk drives or solid-state drives at the branch network location. Virtual storage arrays consolidate data storage at a data center for physical and virtual computer systems at one or more branch network locations. The data center is connected with the branch network locations via one or more wide-area networks (WANs). The virtual disks or other logical storage devices of the virtual storage arrays are mapped to physical data storage at the data center and accessed from the branch location via a WAN using storage block-based protocols, such as iSCSI.

To hide the bandwidth and latency limitations of the WAN from storage users at the branch location, a storage block cache at the branch network location caches prefetched storage blocks. The storage blocks are prefetched based on knowledge about the computer systems at the branch network location and the behavior of their operating systems and applications.

Standalone and virtualized computer systems at the branch location may boot or initialize themselves using operating systems and/or applications stored in the virtual storage arrays. I The virtual disks of the virtual storage array are mapped to physical data storage at the data center and accessed via a WAN using storage block-based protocols.

An embodiment of the invention includes a virtualization system for providing one or more virtualized servers at a branch location. Each virtualized server may replace one or more corresponding physical servers at the branch location. The virtualization system implements virtualized servers using virtual machine applications within the virtualization system. To reduce the costs and complexity of managing servers at the branch location, the data storage for the virtualized servers, such as the boot disks and auxiliary disks of virtualized servers, which may be implemented as virtual machine files and disk images, is consolidated at a data center network location, rather than at the branch location. The virtual disks or other virtual data storage devices of the virtualized servers are mapped to physical data storage at the data center and accessed from the branch location via a WAN using storage block-based protocols.

Storage access requests from the virtualized servers and other storage users at the branch location are fulfilled from the storage block cache when possible. The virtualization system can include a virtual LAN directing network traffic between the WAN, the virtualized servers, and branch location clients. The virtualized servers, virtual LAN, and virtual disk mapping can be configured remotely via a management application. The management application may use templates to create multiple instances of common branch location configurations.

DESCRIPTION OF ILLUSTRATIVE EMBODIMENTS

Figure 1:
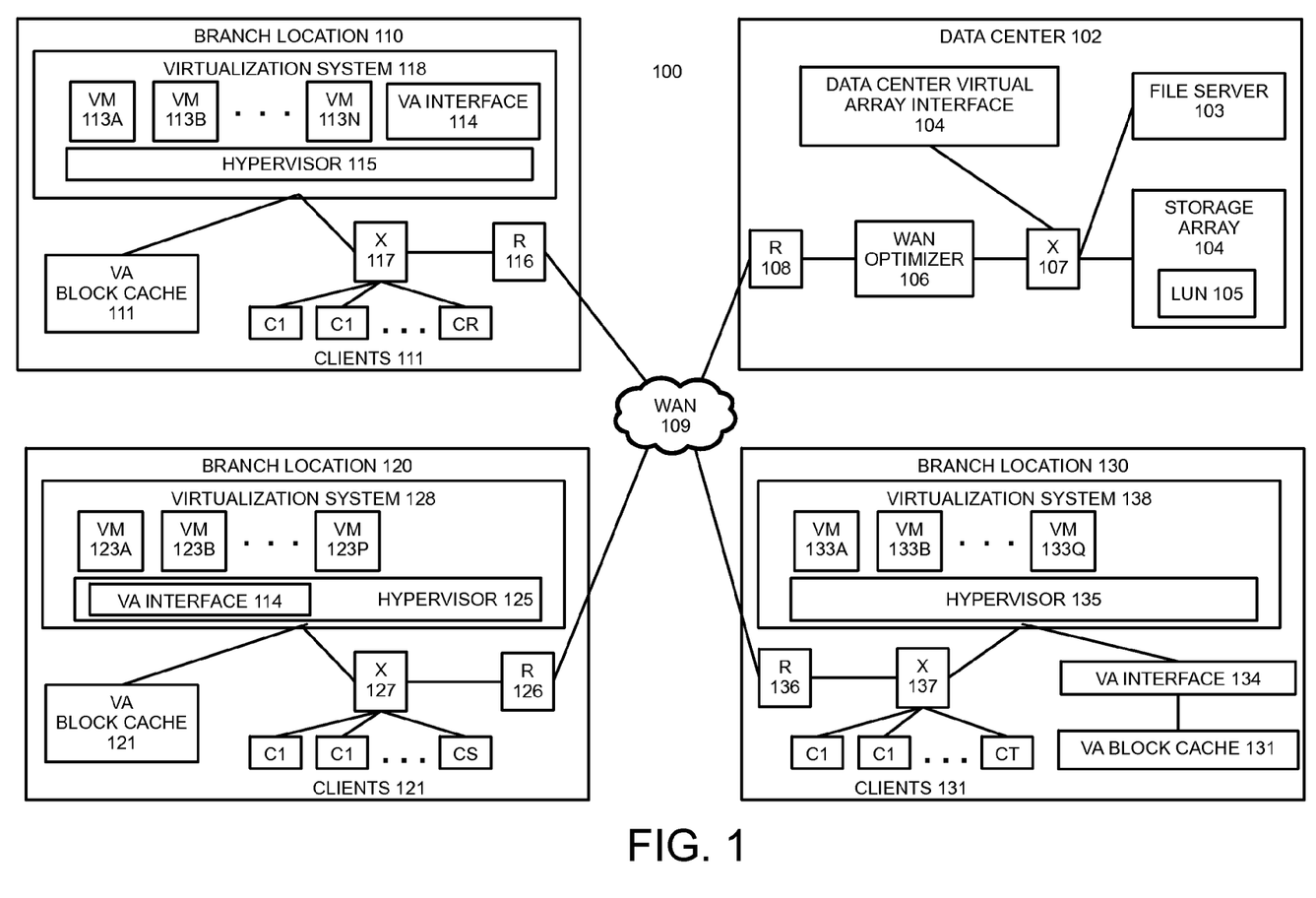
FIG. 1 illustrates several example server virtualization and storage consolidation systems according to embodiments of the invention.

FIG. 1 illustrates a system 100 supporting several examples of server virtualization and storage consolidation over a wide area network according to embodiments of the invention. Example system 100 includes a data center location 102 and three branch locations 110, 120, and 130. The data center location 102 and the branch locations 110, 120, and 130 are connected by at least one wide area network (WAN) 109, which may be the internet or another type of WAN, such as a private WAN.

The data center location 102 is adapted to centralize and consolidate data storage for one or more branch locations, such as branch locations 110, 120, and 130. By consolidating data storage from branch locations 110, 120, and 130 at the data center location 102, the costs and complexity associated with the installation, configuration, maintenance, backup, and other management activities associated with the data storage is greatly reduced. As described in detail below, embodiments of system 100 overcome the limitations of WAN access to data storage to provide acceptable performance and reliability to clients and servers at the branch locations.

In an embodiment, data center location 102 includes a router 108 or other network device connecting the WAN 109 with a data center local area network (LAN) 107. Data center LAN 107 may include any combination of wired and wireless network devices including Ethernet connections of various speeds, network switches, gateways, bridges, wireless access points, and firewalls and network address translation devices.

In a further embodiment, data center LAN 107 is connected with router 108 and WAN 109 via an optional WAN optimization device 106. WAN optimization devices optimize network traffic to improve network performance in reading and/or writing data over a wide-area network. WAN optimization devices may perform techniques such as prefetching and locally caching data or network traffic, compressing and prioritizing data, and bundling together multiple messages from network protocols, traffic shaping. WAN optimization devices often operate in pairs, with WAN optimization devices on both sides of a WAN.

Data center location 102 includes one or more physical data storage devices to store and retrieve data for clients and servers at branch locations 110, 120, and 130. Examples of physical data storage devices include a file server 103 and a storage array 104 connected via a storage area network (SAN). Storage array 104 includes one or more physical data storage devices, such as hard disk drives, adapted to be accessed via one or more storage array network interfaces. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP. Embodiments of the storage array 104 may communicate via the data center LAN 107 and/or separate data communications connections, such as a Fibre Channel network. The storage array 104 presents one or more logical storage units 105, such as iSCSI or Fibre Channel logical unit number (LUN).

In another embodiment, data center location 102 may store and retrieve data for clients and servers at branch locations using a network storage device, such as file server 103. File server 103 communicates via data center local-area network (LAN) 107, such as an Ethernet network, and communicate using a network file system protocol, such as NFS, SMB, or CIFS.

The data storage devices 103 and/or 104 included in data center location 102 are used to consolidate data storage from multiple branches, including branch locations 110, 120, and 130. Previously, the latency, bandwidth, and reliability limitations of typical wide-area networks, such as WAN 109, would have prevented the consolidation of many types of server computers and associated storage from multiple branch locations into a single location, such as data center location 102. However, an embodiment of system 100 includes the usage of virtual storage arrays to optimize the access of data storage devices from branch locations via the WAN 109.

To this end, an embodiment of the data center location 102 includes a data center virtual storage array interface 101 connected with data center LAN 107. The virtual storage array interface 101 enables data storage used by branch locations 110, 120, and 130 to be consolidated on data storage devices 103, 104, and/or 105 at the data center location 102. The virtual storage array interface 101, operating in conjunction with branch location virtual storage array interfaces 114, 124, and 134 at branch locations 110, 120, and 130, respectively, overcomes the bandwidth and latency limitations of the wide area network 109 between branch locations 110, 120, and 130 and the data center 102 by predicting storage blocks likely to be requested in the future by the clients, servers, and/or virtualized servers at branch locations, retrieving these predicted storage blocks from the data storage devices at the data center location 102 and transferring them via WAN 109 to the appropriate branch location, and caching these predicted storage blocks at the branch location.

The branch location virtual storage array interfaces 114, 124, and 134 act as proxy processes that intercept storage block access requests from clients, servers, and/or virtualized servers at their respective branch locations. When the storage block prediction is successful, the branch location virtual storage array interfaces fulfill some or all of the intercepted storage block requests at their respective branch locations from the branch locations' storage block caches. As a result, the latency and bandwidth restrictions of the wide-area network are hidden from the storage users. If a storage block request is associated with a storage block that has not been prefetched and stored in the branch location storage block cache, the branch location virtual storage array interface will retrieve the requested storage block from the data storage devices at the data center location 102 via the WAN 109.

Branch location 110 includes one or more client systems 112, which may be user computers or other communication devices. Client systems 112 communicate with each other and with servers at the branch location via branch location LAN 117. Branch location LAN 117 may include any combination of wired and wireless network devices including Ethernet connections of various speeds, network switches, gateways, bridges, wireless access points, and firewalls and network address translation devices. Branch location 110 includes a router 116 or other network devices connecting branch location 110 with the WAN 109. Client systems 112 may also communicate with remote servers and data storage through LAN 117 and WAN 109. In a further embodiment, branch location LAN 117 is connected with router 116 and WAN 109 via an optional WAN optimization device 119, which is adapted to operate alone or in conjunction with data center WAN optimization device 106 to optimize network traffic to and from branch location 110 via WAN 109, such as between branch location 110 and data center 102.

In an embodiment, one or more servers at the branch location 110 are implemented as virtual machines 113 running in a virtualization system 118. Virtualization system 118 includes hardware and software for executing multiple virtual machines 113 in parallel within a single physical computer system. In this example, virtualization system 118 includes a set of virtual machines 113, including virtual machines 113a, 113b, and 113n. Virtualization system 118 can support any arbitrary number N of virtual machines 113, limited only by the hardware limitations of the underlying physical computer system. Each virtual machine 113 may replace a physical server computer system providing one or more services or applications to other physical and/or virtual servers and/or one or more of the client systems 112.

Virtualization system 118 includes a hypervisor 115 for supporting the set of virtual machines. Hypervisor 115 facilitates communications between the set of virtual machines 113 as well as between the set of virtual machines 113 and the client systems 112. In an embodiment, hypervisor 115 implements a virtual local area network for facilitating communications with the virtual machines 113. Any of the virtual machines 113 may send or receive data via this virtual LAN provided by the hypervisor. The virtualization system 118 is connected with branch location LAN 117 and the hypervisor 115 is adapted to bridge communications between the virtual LAN within hypervisor 115 with the branch location LAN 117. This enables the clients 112 and virtual machines 113 to communicate with each other as well as for virtual machines 113 to communicate with the data center location 102 and/or remote clients, servers, and data storage via WAN 109.

As discussed above, the usage of virtual storage arrays enable clients and servers at branch locations, such as branch location 110, to efficiently access data storage via the WAN 109. This allows for data storage to be consolidated at the data center to reduce data storage costs and administrative complexity, without impacting the performance of servers and clients at the branch location 110.

An embodiment of branch location 110 includes a branch location virtual storage array interface 114 that enables virtual machines 113 and clients 112 to access data storage at the data center location 102 via the WAN 109. The branch virtual storage array interface 114 presents one or more virtual storage devices to storage users, such as hypervisor 115, clients 112 and/or virtualized servers implemented as virtual machines 113. The virtual storage devices provided by the branch virtual storage array interfaces are referred to as virtual logical storage devices or virtual LUNs. The virtual LUNs appear to the hypervisor 115 and/or other storage users as local physical data storage devices and may be accessed using block-based data storage protocols, such as iSCSI, Fibre Channel Protocol, and ATA over Ethernet. However, the primary copy of the data in these virtual LUNs is actually stored in the physical data storage devices at the data center location 102.

In the example embodiment of branch location 110, the branch location virtual storage array interface 114 is implemented as a virtual machine executed by the virtualization system 118. Additionally, the branch location virtual storage array interface 114 is associated with a virtual array storage block cache 111 for storing storage blocks that have been requested by clients or servers at the branch location and/or are likely to be requested in the near future by clients or servers at the branch location. Virtual array storage block cache 111 may be implemented as internal and/or external data storage connected with the virtualization system 118. In a further embodiment, the virtual array storage block cache 111 is also adapted to temporarily store storage blocks created or updated by clients and servers at the branch location 110 until these new and updated storage blocks can be transferred over the WAN 109 to the data center location 102 for storage on a physical data storage device.

Similarly, branch location 120 includes one or more client systems 122, which may be user computers or other communication devices. Client systems 122 communicate with each other and with servers at the branch location 120 via branch location LAN 127 and may also communicate with remote servers and data storage through LAN 127, router 126, and WAN 109. An optional WAN optimization device 129 may optimize network traffic to and from branch location 120 via WAN 109, such as between branch location 120 and data center 102.

In an embodiment, one or more servers at the branch location 120 are implemented as virtual machines 123 running in a virtualization system 128. Virtualization system 128 includes hardware and software for executing multiple virtual machines, including virtual machines 123*a*, 123*b*, and 123*p*, in parallel within a single physical computer system. Virtualization system 128 can support any arbitrary number P of virtual machines 123, limited only by the hardware limitations of the underlying physical computer system. Each of the virtual machines 123 may replace a physical server computer system providing one or more services or applications to other physical and/or virtual servers and/or one or more of the client systems 122.

Virtualization system 128 includes a hypervisor 125 for supporting the set of virtual machines. In an embodiment, hypervisor 125 implements a virtual local area network for facilitating communications between the virtual machines 123. The hypervisor 125 bridges branch local area network 127 with the virtual local area network so that clients 122 and virtual machines 123 can communicate with each other. Additionally, the virtual machines 123 may use the bridged connection with branch local area network 127 to communicate with the data center location 102 and/or remote clients, servers, and data storage via WAN 109.

An embodiment of branch location 120 includes a branch location virtual storage array interface 124 that enables virtual machines 123 and clients 122 to access data storage at the data center location 102 via the WAN 109. The branch virtual storage array interface 124 presents one or more virtual LUNs to storage users, such as the hypervisor 125, clients 122 and/or virtualized servers implemented within virtual machines 123. The virtual LUNs appear to the hypervisor 125 and/or other storage users as local physical data storage devices and may be accessed using block-based data storage protocols, such as iSCSI, Fibre Channel Protocol, and ATA over Ethernet. However, the primary copy of the data in these virtual LUNs is actually stored in the physical data storage devices at the data center location 102.

In the example embodiment of branch location 120, the branch location virtual storage array interface 124 is implemented as a software module within the hypervisor 125. Additionally, the branch location virtual storage array interface 124 is associated with a virtual array storage block cache 121 for storing storage blocks that have been requested by clients or servers at the branch location and/or are likely to be requested in the near future by clients or servers at the branch location. Virtual array storage block cache 121 may be implemented as internal and/or external data storage connected with the virtualization system 128. In a further embodiment, the virtual array storage block cache 121 is also adapted to temporarily store storage blocks created or updated by clients and servers at the branch location 120 until these new and updated storage blocks can be transferred over the WAN 109 to the data center location 102 for storage on a physical data storage device.

Similar to branch locations 110 and 120, branch location 130 includes one or more client systems 132, which may be user computers or other communication devices. Client systems 132 communicate with each other and with servers at the branch location via branch location LAN 137 and may also communicate with remote servers and data storage through LAN 137, router 136, and WAN 109. An optional WAN optimization device 139 may optimize network traffic to and from branch location 120 via WAN 109, such as between branch location 120 and data center 102.

In an embodiment, one or more servers at the branch location 130 are implemented as virtual machines 133 running in a virtualization system 138. Virtualization system 138 includes hardware and software for executing multiple virtual machines, including virtual machines 133*a*, 133*b*, and 133*q*, in parallel within a single physical computer system. Virtualization system 128 can support any arbitrary number Q of virtual machines 133, limited only by the hardware limitations of the underlying physical computer system. Each of the virtual machines 133 may replace a physical server computer system providing one or more services or applications to other physical and/or virtual servers and/or one or more of the client systems 132.

Virtualization system 138 includes a hypervisor 135 for supporting the set of virtual machines. In an embodiment, hypervisor 135 implements a virtual local area network for facilitating communications between the virtual machines 133. The hypervisor 135 bridges branch local area network 137 with the virtual local area network so that clients 132 and virtual machines 133 can communicate with each other. Additionally, the virtual machines 133 may use the bridged connection with branch local area network 137 to communicate with the data center location 102 and/or remote clients, servers, and data storage via WAN 109.

An embodiment of branch location 130 includes a branch location virtual storage array interface 134 that enables virtual machines 133 and clients 132 to access data storage at the data center location 102 via the WAN 109. The branch virtual storage array interface 134 presents one or more virtual LUNs to storage users, such as the hypervisor 135, clients 132 and/or virtualized servers implemented within virtual machines 133. The virtual LUNs appear to the hypervisor 135 and/or other storage users as local physical data storage devices and may be accessed using block-based data storage protocols, such as iSCSI, Fibre Channel Protocol, and ATA over Ethernet. However, the primary copy of the data in these virtual LUNs is actually stored in the physical data storage devices at the data center location 102. Example branch virtual storage array interfaces are described in detail in co-pending U.S. patent application Ser. No. 12/730,185, entitled "Virtualized Data Storage System Architecture", filed Mar. 23, 2010, which is incorporated by reference herein for all purposes.

In the example embodiment of branch location 130, the branch location virtual storage array interface 134 is implemented as an external hardware connected with clients 132 and the virtualization system 138 via branch location LAN 137. Branch location virtual storage array interface 134 may be implemented as a software module on a separate computer system, such as in a standalone network "appliance" form factor, or on a client or server computer system including other software applications.

Additionally, the branch location virtual storage array interface 134 is associated with a virtual array storage block cache 131 for storing storage blocks that have been requested by clients or servers at the branch location and/or are likely to be requested in the near future by clients or servers at the branch location. Virtual array storage block cache 131 may be implemented as internal and/or external data storage connected with the branch location virtual storage array interface 134. In a further embodiment, the virtual array storage block cache 131 is also adapted to temporarily store storage blocks created or updated by clients and servers at the branch location 130 until these new and updated storage blocks can be transferred over the WAN 109 to the data center location 102 for storage on a physical data storage device.

In embodiments of the invention, branch virtual storage array interfaces provide branch location storage users, such as hypervisors within virtualization systems, clients, servers, and virtualized servers, with access to virtual LUNs via storage block based protocols, such as iSCSI, Fibre Channel Protocol, and ATA over Ethernet. The branch locations storage users may use storage block-based protocols to specify reads, writes, modifications, and/or deletions of storage blocks. However, servers and higher-level applications typically access data in terms of files in a structured file system, relational database, or other high-level data structure. Each entity in the high-level data structure, such as a file or directory, or database table, node, or row, may be spread out over multiple storage blocks at various non-contiguous locations in the storage device. Thus, prefetching storage blocks based solely on their locations in the storage device is unlikely to be effective in hiding wide-area network latency and bandwidth limits from storage clients.

In an embodiment of the invention, the virtual storage array interfaces at the data center and/or branch locations leverage an understanding of the semantics and structure of the high-level data structures associated with the storage blocks to predict which storage blocks are likely to be requested by a storage client in the near future. There are a number of different techniques for identifying storage blocks for prefetching that may be used by embodiments of system 100. Some of these are described in detail in co-pending U.S. patent application Ser. No. 12/730,198, entitled "Virtual Data Storage System Optimizations", filed Mar. 23, 2010, which is incorporated by reference herein for all purposes.

For example, storage blocks corresponding with portions of the high-level data structure entity may be prefetched based on the adjacency or close proximity of these portions with a recently accessed portion of the entity. It should be noted that although these two portions are adjacent in the high-level data structure entity, their corresponding storage blocks may be non-contiguous.

Another example technique is to identify the type of high-level data structure entity associated with a selected or recently accessed storage block, such as a file of a specific format, a directory in a file system, or a database table, and apply one or more heuristics to identify additional portions of this high-level data structure entity or a related high-level data structure entity for prefetching. Storage blocks corresponding with the identified additional portions of the high-level data structure entities are then prefetched and cached at the branch location.

Yet another example technique monitors the times at which high-level data structure entities are accessed. High-level data structure entities that are accessed at approximately the same time are associated together by the virtual storage array interface. If any one of these associated high-level data structure entities is later accessed again, the virtual storage array interface identifies one or more associated high-level data structure entities that were previously accessed at approximately the same time as the requested high-level data structure entity for prefetching. Thus, the correlations between previous access times of high-level data structure entities or portions thereof are used to select storage blocks for prefetching. Storage blocks corresponding with the identified additional high-level data structure entities are then prefetched and cached at the branch location.

In still another example technique, a virtual storage array interface analyzes the high-level data structure entity associated with the requested storage block to identify related portions of the same or other high-level data structure entity for prefetching. For example, application files may include references to additional files, such as overlay files or dynamically loaded libraries. Similarly, a database table may include references to other database tables. Operating system and/or application log files may list a sequence of files or other resources accessed during a system or application startup. Storage blocks corresponding with the identified related high-level data structure entities are then prefetched and cached at the branch location.

Further embodiments of the virtual storage array interface may identify corresponding high-level data structure entities directly from requests for storage blocks. Additionally, embodiments of the virtual storage array interface may successively apply any number of successive transformations to storage block requests to identify associated high-level data structure entities. These successive transformations may include transformations to intermediate level data structure entities. Intermediate and high-level data structure entities may include virtual machine data structures, such as virtual machine file system files, virtual machine file system storage blocks, virtual machine storage structures, and virtual machine disk images.

The above-described techniques for identifying high-level data structure entities are used by the virtual storage array interface to identify additional storage blocks likely to be requested in the future by clients, servers, and virtualized clients and servers at the branch location. The virtual storage array interface then prefetches some or all of these additional storage blocks and stores them in a cache at the branch location. If a client, server, or virtualized client or server requests a storage block that has been prefetched by the virtual storage array interface, the requested storage block is provided to the requester from the branch location cache, rather than retrieving the storage block from the data center location via the WAN. In this manner, the virtual storage array interfaces use prefetching, caching, and other optimization techniques to hide the bandwidth, latency, and reliability limitations of the WAN from storage users.

Figure 2:
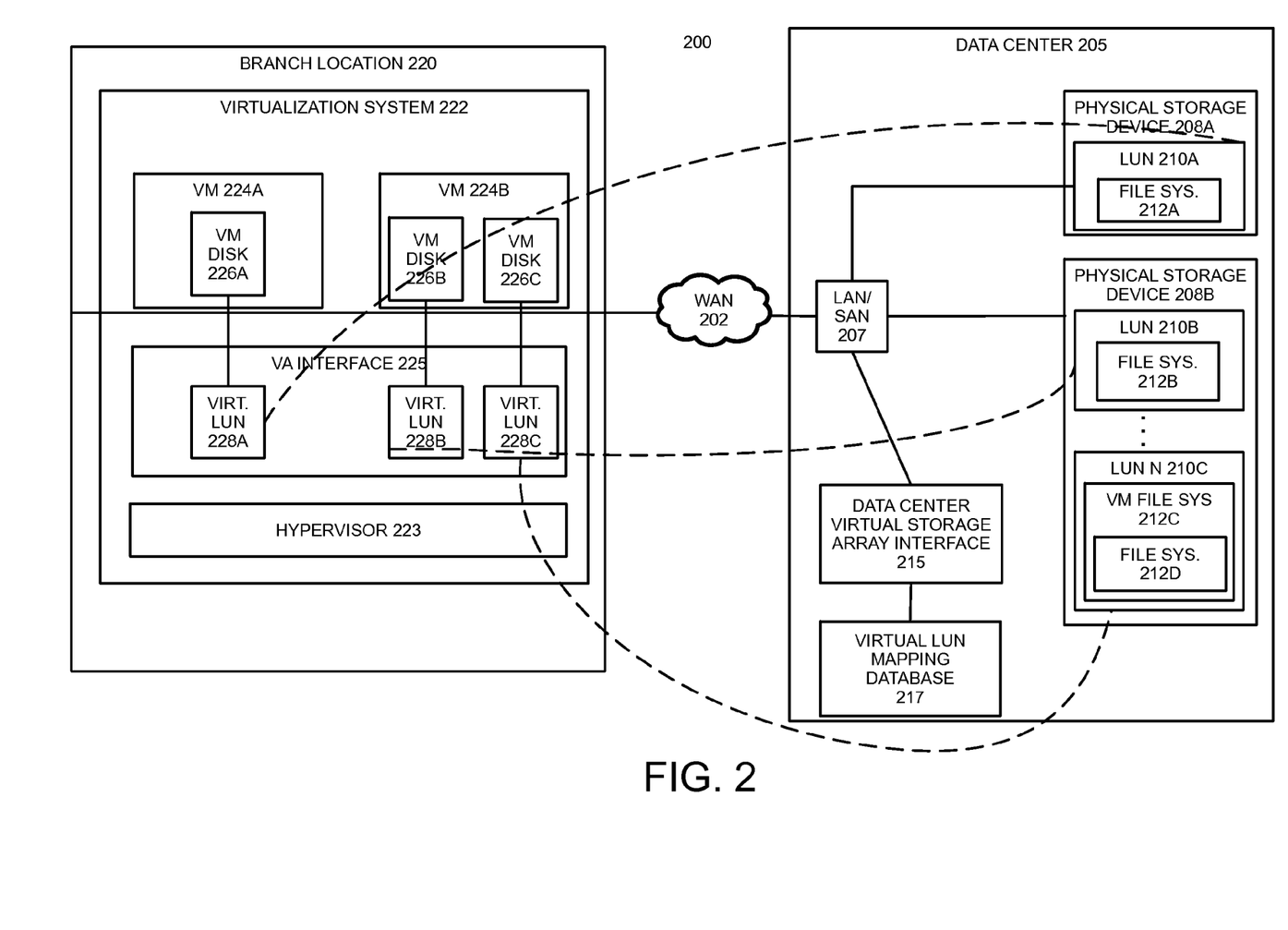
FIG. 2 illustrates example mappings between virtual storage devices at a branch location and corresponding physical data storage at a data center location according to an embodiment of the invention.

The branch virtual storage array presents one or more virtual logical storage devices or virtual LUNs to storage users at the branch location. These virtual LUNs may be assigned or mapped to storage users in a number of ways. FIG. 2 illustrates example mappings 200 between virtual logical storage devices at a branch location and corresponding physical data storage at a data center location according to an embodiment of the invention.

Example mapping 200 illustrates a data center location 205 and a branch location 220 connected via a WAN 202. Data center location 205 includes a data center LAN and/or SAN 207 for connecting physical data storage devices 208 with the data center virtual storage array interface 215. Physical data storage devices 208 may include one or more file servers, storage arrays, or other data storage devices.

Branch location 220 includes a virtualization system 222 and a branch virtual storage array interface 225, similar to those illustrated in FIG. 1. Branch location 220 may also include a LAN, clients, a storage block cache, router, and/or a WAN optimization device; however, these have been omitted from FIG. 2 for clarity. The branch virtual storage array interface 225 may be implemented as a virtual machine within the virtualization system 222, as a separate module within the virtualization system 222, or as an external device, similar to the examples shown in FIG. 1.

Branch location virtualization system 222 supports a number of virtualized servers using an arbitrary number of virtual machines 224, including virtual machines 224A and 224B. Typically, each of the virtual machine is associated with at least one virtual machine disk. For example, a virtual machine typically stores its operating system, installed applications, and application data on at least one virtual machine disk. Each virtual machine disk appears to the operating system and applications executed within the virtual machine as a physical disk or other data storage device. However, hypervisors and other types of virtual machine systems typically implement the virtual machine disks as one or more container files, such as a VMDK file or a disk image file.

In example mapping 200, virtual machine 224a includes a virtual disk 226a and virtual machine 224b includes virtual disks 226b and 226c. Each of the virtual disks 226 is mapped to a corresponding virtual LUN provided by the branch virtual storage array interface 225. In example mapping 200, virtual disks 226a, 226b, and 226c are mapped to virtual LUNs 228a, 228b, and 228c, respectively. In further embodiments of the invention, two or more virtual disks from a single virtual machine or multiple virtual machines may be mapped to a single virtual LUN provided by the branch virtual storage array interface 225.

The association of virtual disks 226 within virtual machines 224 with virtual LUNs 228 provided by the branch virtual storage array interface 225 may be implemented in a number of different ways. In one implementation, a hypervisor 223, such as ESXi, responsible for instantiating and supervising the virtual machines 224 has the capability of presenting any storage device known to the virtualization system 222 as one or more virtual disks 226 within its hosted virtual machines 224. In this implementation, the branch virtual storage array interface 225 presents the virtual LUNs 228 to the hypervisor 223 as local storage devices, such as iSCSI or FCP logical storage devices or LUNs. The assignment of virtual disks 226 to virtual LUNs 228 is specified using hypervisor configuration data.

In another implementation, a hypervisor 223, such as Xen, is configured so that the virtual LUNs 228 appear within virtual machines 224 as one or more mounted virtual disks 226. The hypervisor may be configured or extended via an API, kernel extensions or modifications, or specialized device drivers or files for this implementation.

In yet another implementation, one or more servers or applications executing within the virtual machines 224 may be capable of communicating directly with virtual LUNs 228 provided by the branch virtual storage array interface 225. For example, an application within one of the virtual machines 224 may be capable of reading and writing data via a storage block based protocol, such as iSCSI or iFCP, to logical storage devices or LUNs. In this example, the application can be configured with the storage address and access parameters necessary to access the appropriate virtual LUN provided by the branch virtual storage array interface 225. This implementation may be used to map secondary or auxiliary virtual disks in a virtual machine to a virtual LUN provided by the branch virtual storage array interface. If an operating system is capable of booting via iSCSI or another remote storage block access protocol, then this implementation can be used to map the primary virtual disk in a virtual machine to a virtual LUN.

The branch virtual storage array interface 225 provides one or more virtual logical storage devices or virtual LUNs to the virtual machines, enabling the virtual machines store and retrieve operating systems, applications, services, and data. However, except for a portion of the virtual LUN contents cached locally in a storage block cache at the branch location 220, the primary data storage for these virtual LUNs is located at the data center location 205. Thus, the branch virtual storage array interface 225 must map each of its virtual LUNs to one or more physical LUNs or logical storage units 210 provided by the physical storage devices 208 at the data center location 205.

In an embodiment, the data center location 205 includes a virtual LUN mapping database 217. Virtual LUN mapping database 217 is adapted to configure the branch virtual storage array interface 225 and the data center virtual storage array interface 215. This configuration includes the assignment of virtual LUNs provided by one or more branch virtual storage array interfaces (for example at multiple branch locations) with corresponding physical logical storage devices or physical LUNs 210 provided by the physical storage devices 208 at the data center 205.

In this example, virtual LUN 228a is mapped to physical LUN 210a provided by physical storage device 208a. Thus, any application accessing virtual disk 226a (whether located within virtual machine 224a, another virtual machine, or outside virtualization system 222) is actually accessing the physical LUN 210a provided by physical storage device 208a at the data center location 205. Similarly, virtual LUNs 228a and 228b are mapped to physical LUNs 210b and 210c, respectively, provided by physical storage device 208b. The association of virtual LUNs to physical LUNs 210 and physical storage devices 208 may be arbitrary and a physical storage device may provide any number of physical LUNs mapped to virtual LUNs for any number of virtual disks at any number of branch locations, subject only to the limitations of the hardware and the network.

Each of the physical LUNs 210 corresponding with a virtual LUN may include data of any type and structure, including disk images, virtual machine files, file systems, operating systems, applications, databases, and data for any of the above entities. For example, physical LUN 210a includes a file system 212a, such as an NTFS or Ext3 file system. Physical LUN 210b also includes a file system 212b, which may be the same or a different type as file system 212a, depending on the configuration of the associated virtual disk 226b.

Physical LUN 210c includes a virtual machine file system 212c, such as VMWare's VMFS (Virtual Machine File System), which is specifically adapted to represent the contents of one or more virtual disks used by a virtual machine. Virtual machine file system 212c includes one or more virtual machine disk files in a format such as VMDK, each of which contains one or more file systems 212d used to organize the contents of a virtual disk. A virtual machine file system may be used by embodiments of the invention to conveniently store the complete contents of a virtual machine. As described below, a virtual machine file system may also be used as part of a template to conveniently create and instantiate one or more copies of a virtual machine at different branch locations. Although virtual machine file systems are often used to store and deploy virtual machines, embodiments of the invention may perform similar operations both with normal file systems assigned to virtual machines and with virtual machine file systems.

As described above, embodiments of the virtualization systems may include an internal virtual LAN to facilitate communications with virtualized servers implemented using virtual machines. Further embodiments of the virtualization system may also be used to control network traffic between a branch location LAN and a WAN.

Figure 3:
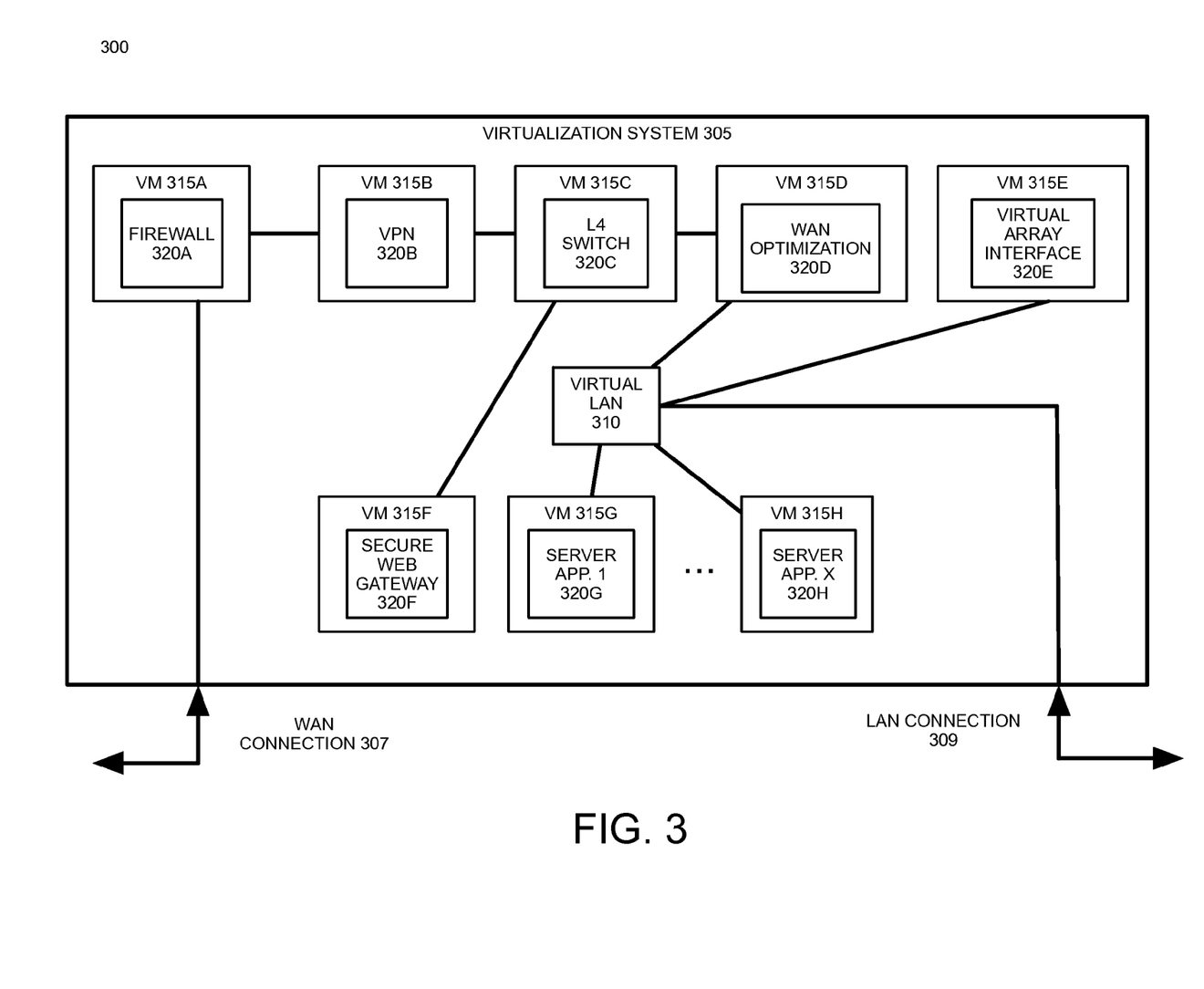
FIG. 3 illustrates an example arrangement of virtual servers and virtual local area network connections within a virtualization system according to an embodiment of the invention.

FIG. 3 illustrates an example arrangement 300 of virtual servers and virtual local area network connections within a virtualization system according to an embodiment of the invention. Arrangement 300 includes a virtualization system 305, similar to the virtualization systems shown in FIGS. 1 and 2. Virtualization system 305 includes at least one wide-area network connection 307 for connecting with a WAN and at least one local-area network connection 309 for connecting with a branch location LAN. Virtualization system 305 includes a set of virtual machines 315 implementing virtualized servers. Other elements of the virtualization system 305, such as a hypervisor and a branch location virtual storage array interface, are omitted from FIG. 3 for clarity.

Virtualization system 305 includes a virtual LAN 310 for facilitating communications between WAN connection 307, LAN connection 309, and virtual machines 315 hosted by the virtualization system 305. Virtual LAN 310 may emulate any type of network hardware, software, and network protocols known in the art. In an embodiment, virtual LAN 310 emulates an Ethernet network. In this embodiment, each of the virtual machines 315 includes a virtual network interface, which is accessed by the operating system and applications within the virtual machine in the same manner as a physical network interface. The virtual network interface enables the operating system and applications within a virtual machine to communicate using the virtual LAN 310.

Arrangement 300 illustrates an example set of virtualized servers implemented using the virtual machines 315 and an example configuration of the virtual LAN 310. In this arrangement 300, virtual LAN 310 routes network traffic from the WAN connection 307 to virtual machine 315a, which includes a firewall application 320a. Virtual LAN 310 connects virtual machine 315a and firewall application 320a with virtual machine 315b, which includes a virtual private networking (VPN) application 320b. Virtual LAN 310 connects virtual machine 315b and VPN application 320b with virtual machine 315c, which includes a layer 4 network switching application 320c.

Virtual LAN 310 connects virtual machine 315c and layer 4 switching application 320c with virtual machines 315d and 315f. Virtual machine 315f includes a secure web gateway application 320f, which enables users outside of the branch location to access the servers and virtualized servers at the branch location via a WAN. Virtual machine 315d includes a WAN optimization application 320d. WAN optimization application 320d improves network performance in reading and/or writing data over the WAN by performing techniques such as prefetching and locally caching data or network traffic, compressing and prioritizing data, and bundling together multiple messages from network protocols, traffic shaping.

WAN optimization application 320d within virtual machine 315d may replace or supplement a separate branch location WAN optimization device, such as those shown in FIG. 1. In an embodiment, the WAN optimization application 320d operates in conjunction with a WAN optimization device or application at the data center location and/or other branch locations.

Virtual machine 315d and WAN optimization application 320d are connected with multiple virtual machines, including virtual machines 315e, 315g, and 315h, via virtual LAN 310. In arrangement 300, virtual machine 315e includes a branch virtual storage array interface application 320e. Branch virtual storage array interface application 320e provides storage users at the branch location, including applications 320 within virtual machines as well as clients outside of the virtualization system 305, with access to one or more virtual LUNs, as described above. In other embodiments of the invention, branch virtual storage array application 320e in virtual machine 315e may be replaced with a separate software module within the virtualization system 305, such as a module within a hypervisor, or with an external hardware and software device.

Virtualization system 305 may also include an arbitrary number X of virtual machines 315 for executing additional server applications 320. For example, virtual machine 315g includes at least server application 1 320g and virtual machine 315h includes at least server application X 320h. Additionally, virtual LAN 310 is connected with LAN connection 309, enabling communications between the storage users and clients on the branch location LAN, the virtual machines within the virtualization system 305, and the WAN.

Arrangement 300 illustrates an example set of virtualized servers implemented using the virtual machines 315 and an example configuration of the virtual LAN 310. However, the virtualization system 305 enables many alternative arrangements of virtualized servers and configurations of the virtual LAN. One advantage of embodiments of the virtualization system is the ability to easily and flexibly deploy and manage a variety of types of virtualized servers and virtual LAN configurations at one or more branch locations without incurring substantial costs for additional hardware and administration. Moreover, although each of the virtual machines in arrangement 300 only includes one server application, embodiments of the virtualization system can include multiple server applications in each virtual machine, depending upon the preferences of system administrators.

Because the virtualization systems described above can be configured to implement one or more virtualized servers and a virtual LAN network between these virtual machines, a single virtualization system may provide a broad range of services and networking functions typically required at a branch location. In these applications, the virtualization system acts as a "branch office in a box," greatly reducing the complexity and cost associated with the installation, configuration, and management of network and computing infrastructure at branch locations. Additionally, the usage of virtual storage arrays further reduces the costs and complexity associated with branch locations by enabling the consolidation of data storage required by branch locations at a data center.

To facilitate the installation, configuration, and management of virtualized servers, virtual LANs, and virtual storage arrays in virtualization systems at branch locations, an embodiment of the invention includes a management application. The management application enables system administrators to specify configurations of one or more virtualization systems at one or more branch locations, including the types of virtualized servers, virtual LAN connections between virtual machines within the virtualization system, the number and type of virtual LUNs provided by the branch virtual storage array interface, and the mapping of virtual LUNs with virtual disks within virtual machines and with physical LUNs on physical storage devices at the data center. The management application may be adapted to configure virtualization systems remotely, such as via a WAN. In a further embodiment, the management application can instantiate copies of a previously defined virtualization system configuration at one or more branch locations.

Figure 4:
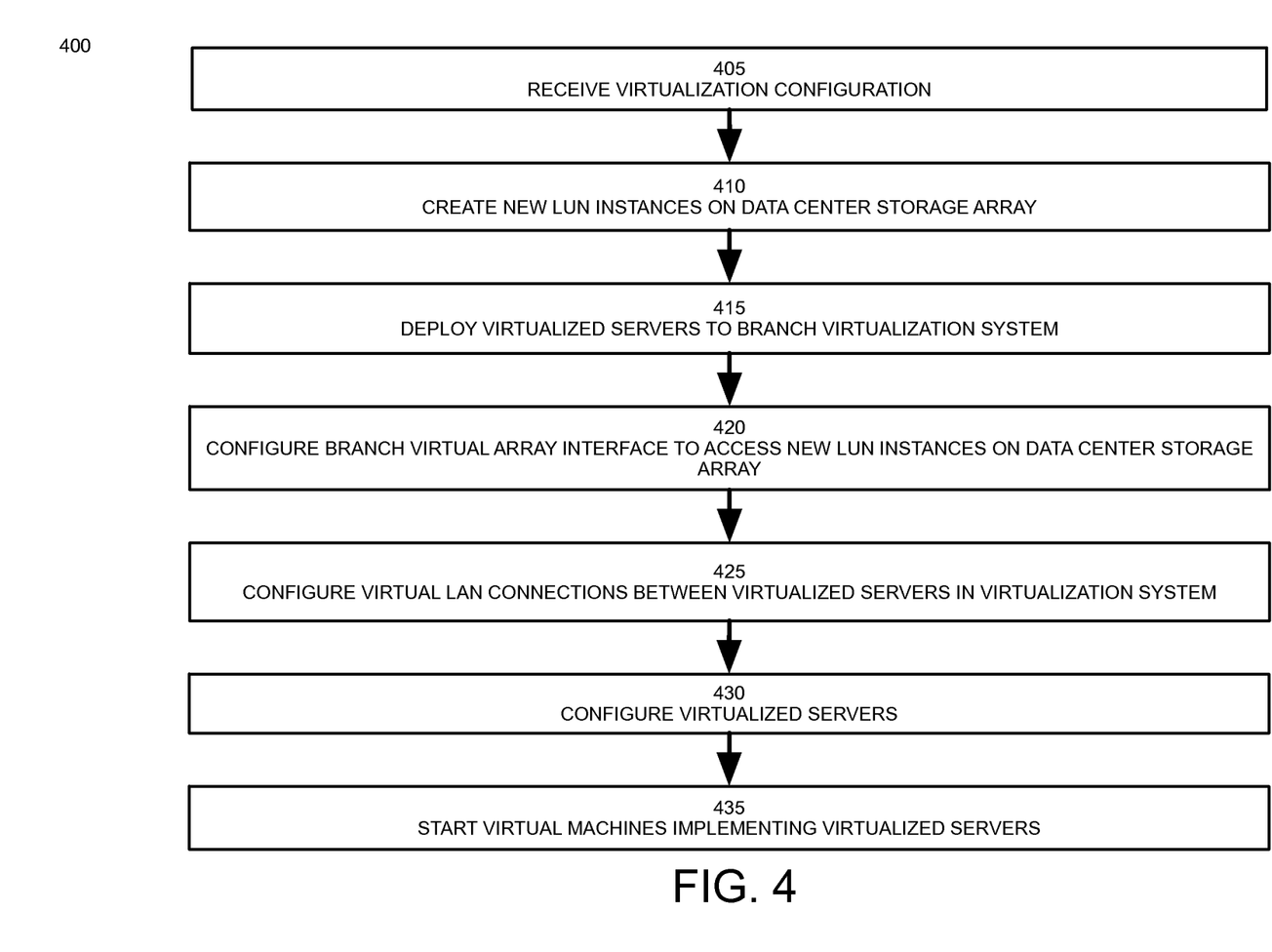
FIG. 4 illustrates a method of deploying virtual servers and virtual local area network connections within a virtualization system according to an embodiment of the invention.

FIG. 4 illustrates a method 400 of deploying virtual servers and virtual local area network connections within a virtualization system according to an embodiment of the invention. Step 405 receives a virtualization configuration for a branch location virtualization system. In an embodiment, the virtualization configuration includes a specification of the types of virtualized servers to be implemented by the virtualization system; virtual LAN connections between virtual machines within the virtualization system; the number and type of virtual LUNs to be provided by the branch virtual storage array interface; and the mapping of virtual LUNs with virtual disks within virtual machines and with physical LUNs on physical storage devices at the data center.

In an further embodiment, step 405 may receive the virtualization configuration in the form of a virtualization template adapted to be used to instantiate copies of a previously defined virtualization system configuration at one or more branch locations. In this embodiment, the virtualization template may include general attributes of the virtualization system configuration, such as the number and type of virtual machines, the virtual LAN configuration, and the number and type of virtual LUNs. Branch-specific attributes of the virtualization system configuration, such as branch-specific network addresses or application configurations, may be provided by the system administrator and/or the management application.

Step 410 creates new physical LUNs on the data center physical data storage, if necessary, for use by the branch location virtualization system and branch location storage users. In an embodiment, step 410 copies previously-created virtual machine files corresponding with virtualized servers specified in the virtualization configuration to new physical LUNs on the data center physical data storage. These previously-created virtual machine files may be created by system administrators and optionally associated with virtualized servers in virtualization templates. In this embodiment, the previously-created virtual machine files are master copies of virtualized servers to be copied and instantiated as needed to instantiate multiple versions of the virtualized servers. The virtual machine files may be specialized virtual machine file system files or disk image files and/or a file system and files to be used by a virtual machine. Alternatively, step 410 may be configured to recognize and use previously created physical LUNs for the branch virtualization system and/or branch location storage clients. In an embodiment, step 410 may also create new physical LUNs for auxiliary storage required by virtualized servers and/or branch location storage users. These new physical LUNs may be empty or step 410 may optionally copy applications and/or data or run scripts to prepare these new physical LUNs for use.

Step 415 configures the branch and data center virtual storage array interfaces according to the virtualization configuration. In an embodiment, step 415 specifies the number and type of virtual LUNs to be provided by the branch virtual storage array interface. Step 415 also specifies to the branch virtual storage array interface and/or the data center virtual storage array interface the mapping between these virtual LUNs and the newly created physical LUNs.

Step 420 deploys the virtualized servers to the branch location virtualization system. In an embodiment, step 420 contacts the branch virtualization system via a LAN and/or WAN connection and transfers at least a portion of the virtualization configuration to the virtualization system. This specifies the number and type of virtual machines to be executed by the virtualization system. Step 420 also uses this virtualization configuration to specify the mapping of virtual disks used by the virtual machines to virtual LUNs provided by the branch location virtual storage array interface. The mapping of virtual disks to virtual LUNs can include storage addresses and/or other access parameters required by virtual machines and/or the virtualization system to access the virtual LUNs.

Step 425 configures the virtual LAN within the branch location virtualization system between the virtual machines, one or more physical network connections of the virtualization system, the branch virtual storage array interface, and/or branch location storage users. The virtual LAN configuration may include a virtual LAN topology; the network configuration of the virtual machines, such as IP addresses; and optionally traffic processing rules.

In an embodiment, step 425 specifies the virtual LAN in the form of one or more unidirectional network traffic flow specifications, referred to as hyperswitches. The use and operation of hyperswitches is described in detail in co-pending patent application Ser. No. 12/496,405, filed Jul. 1, 2009, and entitled "Defining Network Traffic Processing Flows Between Virtual Machines," which is incorporated by reference herein for all purposes.

Hyperswitches may be implemented as software and/or hardware within a network device. Each hyperswitch is associated with a hosted virtual machine. Each hyperswitch is adapted to receive network traffic directed in a single direction (i.e. towards or away from a physical network connected with the virtualization system). Each hyperswitch processes received network traffic according to rules and rule criteria. In an embodiment, example rules include copying network traffic to a virtual machine, redirecting network traffic to a virtual machine, passing network traffic towards its destination unchanged, and dropping network traffic. Each virtual machine may be associated with two or more hyperswitches, thereby independently specifying the data flow of network traffic to and from the virtual machine from two or more networks.

Step 430 configures the virtualized servers. In an embodiment, step 430 configures server applications on the branch location virtual machines within the virtualization system to operate correctly at the branch location. The type of configuration performed by step 430 may depend on the types and combinations of virtualized servers as well as the virtual LAN configuration. Examples of virtualized server configuration performed by step 430 may include configuring network addresses and parameters, file and directory paths, the addresses and access parameters of other virtualized servers at the branch locations, and security and authentication parameters.

Once the configuration of the virtual machines, the virtual LAN, and the virtual LUNs in the branch location virtualization system is complete, step 435 starts the virtualized servers. In an embodiment, step 435 directs the virtualization system to start and boot its virtual machines including the virtualized servers. Additionally, step 435 may direct the virtualization system to activate the virtual LAN and enable access to the virtual LUNs provided by the branch virtual storage array interface.

In an embodiment, method 400 does not need to transfer the contents of the virtual machine files used by the virtualized servers to the branch location prior to starting the virtualized servers. As described above, the virtual storage array interfaces enable the virtual machines implementing the virtualized servers to access virtual LUNs as if they were local physical data storage devices. The virtual storage array interfaces use prefetching and caching to hide the latency and bandwidth limitations of the WAN from the virtualized servers.

In this application, as a virtual machine implementing a virtualized server is started, the virtual machine will begin to read storage blocks from its mapped virtual LUN. The branch and data center virtual storage array interfaces will use knowledge about the data and the behavior of the virtual machine to automatically prefetch additional storage blocks likely to be accessed by the virtual machine in the near future. These prefetched additional storage blocks are transferred via the WAN from the corresponding physical LUN at the data center to the branch location, where they are cached. If virtual storage array interfaces make correct predictions of the virtual machine's future storage requests, then future storage block requests from the virtual machine will be fulfilled from the branch location storage block cache. Thus, the branch location virtual machines can start and boot without waiting for a complete copy of any physical LUN to be transferred to the branch location.

Figure 6:
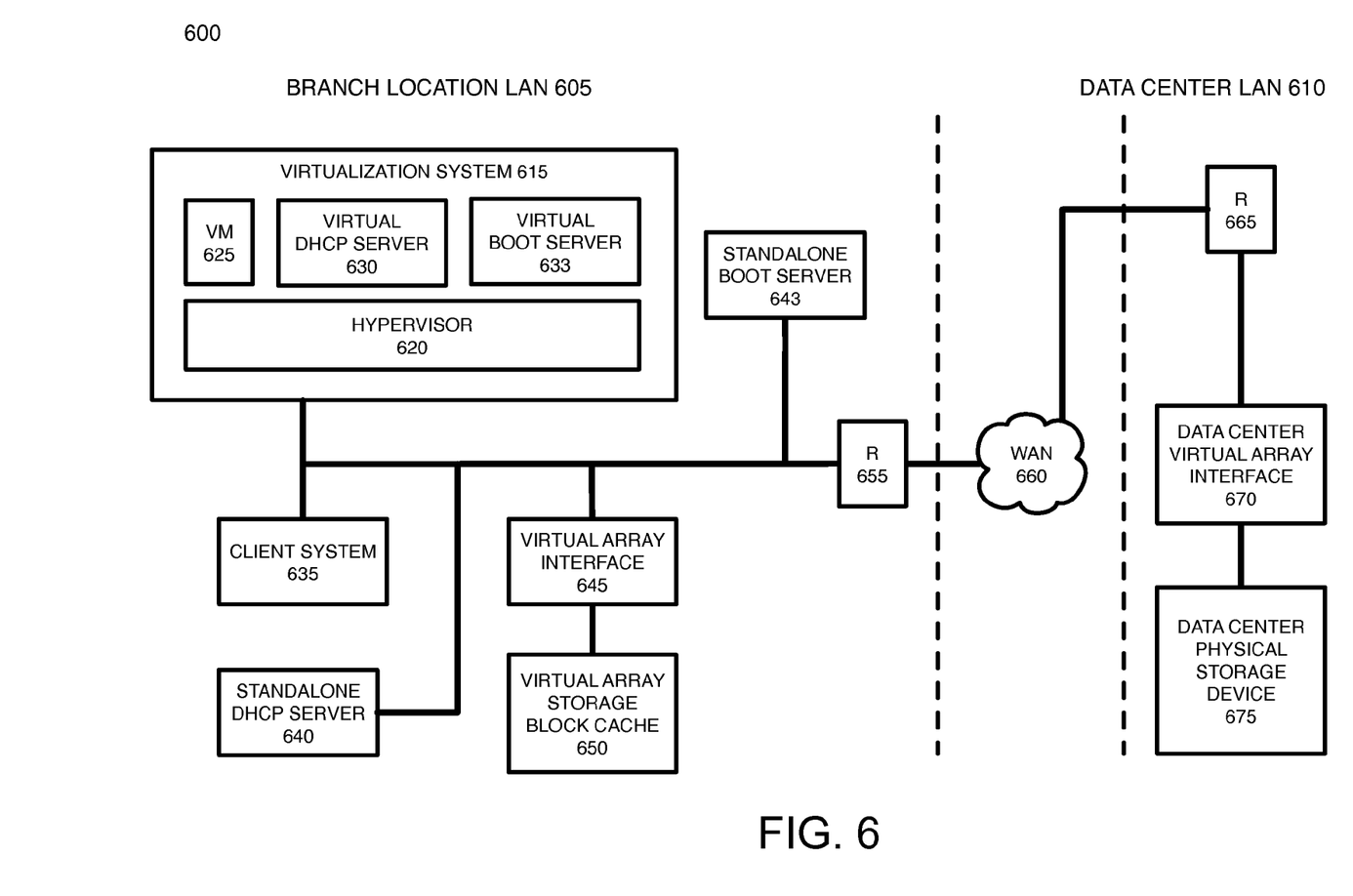
FIG. 6 illustrates an example system for booting clients from virtual storage arrays according to an embodiment of the invention.

FIG. 6 illustrates an example system 600 for booting client systems from virtual storage arrays according to an embodiment of the invention. Client systems may include user computer systems and other devices including computing capabilities and/or standalone server computers. In an embodiment, client systems load and store their operating systems, applications, and client data from virtual storage arrays and thus do not require any non-volatile data storage devices such as hard disk drives or solid-state drives.

System 600 includes a branch location local-area network (LAN) 605 and a data center LAN 610 connected via at least one wide-area network (WAN) 660, which may be the internet or another type of WAN, such as a private WAN.

In this example 600, branch location LAN 605 includes a virtualization system 615. Virtualization system 615 includes a hypervisor 620 and optionally one or more virtual machine applications 625.

In addition to or instead of the virtualization system 615, the branch location LAN 605 may include one or more client systems 635. Client systems 635 may include user computer systems and other devices including computing capabilities and/or standalone server computers. In an embodiment, client systems 635 do not require non-volatile data storage devices such as hard disk drives or solid-state drives to store their operating systems, applications, and/or client data. Instead, these client systems 635 may utilize virtual storage arrays for some or all of their data storage. Thus, these client systems 635 may boot or initialize themselves using operating systems, applications, and data stored in virtual storage arrays, with the physical storage of the operating systems, applications, and data located at the data center LAN 610 and separated from the client systems 635 via WAN 660.

To access logical storage units in the virtual storage arrays, branch location LAN 605 includes a virtual array interface 645. As described above, virtual array interface 645 may be implemented within the virtualization system 615 or as a separate, standalone device. Additionally, virtual array interface 645 includes a storage block cache 650 for caching prefetched storage blocks in advance of requests from clients 635 and/or virtual machine applications 625 in the virtualization system.

Branch location LAN 605 includes a router 655 or other network devices connecting branch location LAN 605 with the WAN 660. Client systems 635, the virtual storage array interface 645, and/or virtual machine applications 625 may also communicate with remote servers and data storage through branch location LAN 605 and WAN 660. In a further embodiment, branch location LAN 605 is connected with router 655 and WAN 660 via an optional WAN optimization device, which is adapted to operate alone or in conjunction with a data center WAN optimization device to optimize network traffic to and from branch location 605 via WAN 660.

Data center LAN 610 is also connected with WAN 660, and thus devices located on data center LAN 610 may communicate with devices on the branch location LAN 605 through the WAN 660. The data center LAN 610 is adapted to centralize and consolidate data storage for clients and virtual machine applications in one or more branch location LANs, such as branch location LAN 605. As described in detail above, the virtual storage array interface 645 overcomes the limitations of WAN access to data storage to provide acceptable performance and reliability to clients 635 and virtual machine applications 625 at the branch location LAN 605.

To this end, an embodiment of the data center LAN 610 includes a data center virtual storage array interface 670. The data center virtual storage array interface 670 operates in conjunction with branch location virtual storage array interface 645 to overcome the bandwidth and latency limitations of the WAN 660 by predicting storage blocks likely to be requested in the future by the clients 635 and/or virtual machine applications 635, retrieving these predicted storage blocks from the data storage devices at the data center location LAN 610, and transferring them via WAN 660 to the branch location LAN 605, and caching these predicted storage blocks in the virtual array storage block cache 650.

Data center LAN 610 includes one or more physical data storage devices 675 to store and retrieve data for clients 635 and virtual machine applications. Examples of physical data storage devices 675 include a file server and a storage array connected via a storage area network (SAN), and/or network storage devices. Physical storage devices 675 may use block-based data storage protocols, such as iSCSI, Fibre Channel Protocol, and ATA over Ethernet and/or network file system protocols such as NFS, SMB, or CIFS.

Additionally, the data center LAN 610 may include a router 665 or other network device connecting the WAN 660 with a data center LAN 610. In a further embodiment, data center LAN 610 is connected with router 665 and WAN 660 via an optional WAN optimization device.

Additionally, the branch location LAN 605 and/or the data center LAN 610 may include other entities to assist in booting and/or initializing clients 635 and/or virtual machine applications 625 from virtual storage arrays. In example 600, the branch location LAN 605 includes one or more DHCP servers that are adapted to provide clients with the network addresses of one or more boot servers. For example, branch location LAN 605 may include a standalone DHCP server 640. In addition to or instead of the standalone DHCP server 640, the virtualization system 615 may include a virtual DHCP server 630 implemented within a virtual machine application and connected to branch location LAN 605 via a virtual local area network connection implemented within virtualization system 615.

Additionally, branch location LAN 605 includes one or more boot servers to assist clients in booting or initializing themselves using the virtual storage array. For example, virtualization system 615 may include a virtual boot server 633. Virtual boot server 633 may be implemented within a virtual machine application within the virtualization system 615. The branch location LAN 605 may include a standalone boot server 643 in addition to or instead of the virtual boot server 633. The DHCP server and boot server functions may also be provided by the same server (either physical or virtual) in a combined system which serves both purposes.

In an embodiment, a boot server is adapted to provide a client with one or more applications, scripts, and/or configuration data to enable the client to access an appropriate logical storage unit in the virtual storage arrays that includes an operating system, one or more applications, and/or client data. The boot server may utilize any standard or proprietary network boot protocol or combination of protocols known in the art, including DHCP; TFTP; and PXE and gPXE execution environments and associated protocols.

Embodiments of the invention may facilitate booting clients and/or virtual machine applications, referred to generally as computer systems, from virtual storage arrays in a number of different ways. For example, upon activating or powering up a client, starting a virtual machine application, or otherwise activating any other type of computer system, an embodiment initializes a pre-execution environment such as the Preboot eXecution Environment (PXE) that is capable of network booting. The pre-execution environment uses a network interface included in the computer system to contact a DHCP server to receive a network address. The network interface may be a physical network interface included in a client or a virtual network interface included in a virtual machine application. Similarly, the DHCP server may be a standalone DHCP server or a virtual DHCP server.

In response to the computer system, the DHCP server provides the computer system with a network address and the network addresses of one or more boot servers. In a further example, the DHCP server may supply the filename or other identifier for an initial software application or script. A boot server may be a virtual boot server implemented within a virtual machine application or a standalone boot server. The computer system contacts one or more of the boot servers to retrieve an initial software application or script adapted to boot or initialize the computer system. This initial software application may be retrieved using a file transfer protocol, such as TFTP. Typically, this initial software application or script enables the computer system to connect to and to mount a logical storage unit provided by the virtual storage array. The initial software application or script then directs the computer system to load and execute an operating system and any other applications from the virtual storage array. For example, if the virtual storage array interface uses the iSCSI protocol to provide access to logical storage units, then the boot server will provide the computer system with the IP address of the virtual storage array and an identifier for which LUN to access.

In a further example, booting and initializing computer systems using a virtual storage array may be performed in two phases. Upon powering up or starting a computer system, a pre-execution environment associated with the computer system's network interface, such as PXE, contacts a standalone or virtual DHCP server to retrieve a network address, the network addresses of one or more standalone or virtual boot servers, and optionally the filename or other identifier for a second pre-execution environment. The computer system then contacts a boot server to retrieve the second pre-execution environment using a file transfer protocol such as TFTP.

The second pre-execution environment is adapted to connect with a storage device using a storage protocol provided by the virtual storage array interface. For example, if the virtual storage array interface uses the iSCSI protocol to provide access to logical storage units, then the boot server will provide the computer system with an iSCSI-capable pre-execution environment, such as gPXE.

The computer system will execute the second pre-execution environment and contact the same or a different DHCP server to retrieve the network addresses of one or more boot servers, which may be the same or different than the boot servers initially provided to the computer system, and optionally a filename or other identifier of an initial software application, boot script, and/or other boot configuration data. Using the second pre-execution environment, the computer system will retrieve an initial software application, boot script, or other boot configuration data from one of these second boot servers. This is used to connect to and to mount a logical storage unit provided by the virtual storage array. The initial software application or boot script then directs the computer system to load and execute an operating system and any other applications from the virtual storage array.

As described above, one or more of the servers used in network booting clients and/or virtual machine applications may be implemented as virtual servers in a virtualization system. However, virtualization system 615 may be omitted from branch location LAN 605. For example, if the branch location LAN 605 includes a standalone virtual array interface and a standalone DHCP server and does not require any virtualized servers for other applications, then the virtualization system 615 may be omitted.

Figure 5:
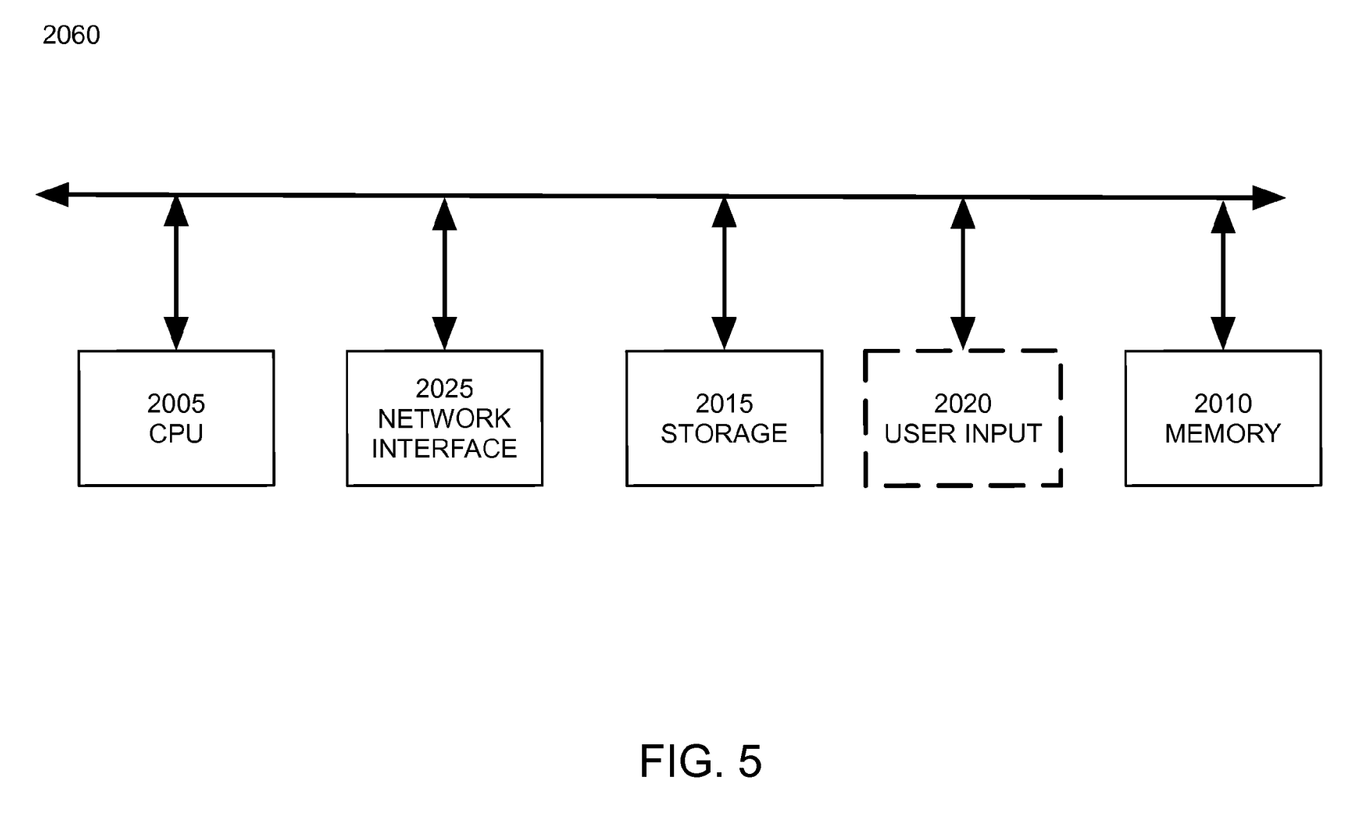
FIG. 5 illustrates a computer system suitable for implementing embodiments of the invention.

Embodiments of the invention can implement the virtualization system as standalone devices or as part of other devices, computer systems, or applications. FIG. 5 illustrates an example computer system capable of implementing a virtual storage array interface according to an embodiment of the invention. FIG. 5 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, or other magnetic, optical, or solid state storage devices. In an embodiment, storage 2015 includes multiple storage devices configured to act as a storage array for improved performance and/or reliability. In a further embodiment, storage 2015 includes a storage array network utilizing a storage array network interface and storage array network protocols to store and retrieve data. Examples of storage array network interfaces suitable for use with embodiments of the invention include Ethernet, Fibre Channel, IP, and InfiniBand interfaces. Examples of storage array network protocols include ATA, Fibre Channel Protocol, and SCSI. Various combinations of storage array network interfaces and protocols are suitable for use with embodiments of the invention, including iSCSI, HyperSCSI, Fibre Channel over Ethernet, and iFCP.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art after reading the attached documents. For example, embodiments of the invention can be used with any number of network connections and may be added to any type of network device, client or server computer, or other computing device in addition to the computer illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of initializing a computer system at a first network location, the method comprising:
   receiving a message indicating an activation of a computer system;
   configuring the computer system to access a virtual logical storage unit provided by a virtual storage array interface at the first network location, wherein the virtual logical storage unit corresponds with a physical logical storage device at a second network location, wherein the second network location is connected with the first network location via a wide-area network;
   receiving storage block requests from the computer system for storage blocks in the virtual logical storage unit, wherein the storage blocks are associated with an initialization process of the computer system; and
   in response to the storage block requests, servicing at least a first storage block request included in the storage block requests from the physical logical storage device via the wide-area network and at least a second storage block request in the storage block requests from a storage block cache at the first network location.

2. The method of claim 1, wherein the received storage block requests from the computer system include a storage block request from a pre-execution environment executed by the computer system.

3. The method of claim 1, wherein the received storage block requests from the computer system include a storage block request from an operating system executed by the computer system.

4. The method of claim 1, wherein configuring the computer system to access a virtual logical storage unit provided by a virtual storage array interface at the first network location includes providing the computer system with access to a boot server at the first network location.

5. The method of claim 4, wherein the boot server is a virtual boot server.

6. The method of claim 1, wherein the computer system is implemented as a virtual machine application.

7. The method of claim 6, wherein the virtual machine application and the virtual storage array interface are implemented within a first device at the first network location.

8. The method of claim 1 comprising:
   prefetching a portion of storage blocks included in the physical logical storage device at the second network location;
   communicating the prefetched portion of the storage blocks via the wide-area network to the first network location; and
   storing copies of the portion of the storage blocks included in the physical logical storage device.

9. The method of claim 8, wherein prefetching the portion of storage blocks comprises:
   identifying the first one of the storage requests as associated with first high-level data structure entity associated with the initialization process of the computer system;
   identifying an association between the first high-level data structure entity and a second high-level data structure entity;

identifying at least one additional storage block in the physical logical storage device associated with the second high-level data structure entity; and selecting the at least one additional storage block for prefetching.

10. The method of claim 9, wherein the first high-level data structure entity includes a first file used by the initialization process of the computer system.

11. The method of claim 10, wherein the first file is a log file.

12. The method of claim 10, wherein the second high-level data structure entity includes a second file referenced by the first file.

13. The method of claim 9, wherein the first high-level data structure entity is associated with a pre-execution environment.

14. The method of claim 9, wherein the first high-level data structure entity is associated with an operating system.

15. The method of claim 9, wherein the association between the first high-level data structure entity and the second high-level data structure entity includes a reference included in the first high-level data structure entity to the second high-level data structure entity.

16. The method of claim 9, wherein the association between the first high-level data structure entity and the second high-level data structure entity includes a previous access time of the second high-level data structure entity having a correlation with a previous access time of the first high-level data structure entity.

17. A system for initializing a computer system, the system comprising:

a computer system at a first network location;

a physical logical storage device at a second network location, wherein the second network location is connected with the first network location via a wide-area network;

a virtual storage array interface at the first network location, wherein the virtual storage array interface provides a virtual storage unit at the first network location corresponding with the physical logical storage device at the second network location; and a boot server at the first network location, wherein the boot server includes configuration information adapted to configure the computer system to send at least first and second storage block requests from the virtual storage unit during an initialization process of the computer system;

wherein the virtual storage array interface services at least the first storage block request from the physical logical storage device at the second network location via the wide-area network and services at least the second storage block request from a storage block cache at the first network location.

18. The system of claim 17, wherein the first and second storage block requests from the first computer system include a storage block request from a pre-execution environment executed by the computer system.

19. The system of claim 17, wherein the first and second storage block requests from the computer system include a storage block request from an operating system executed by the computer system.

20. The system of claim 17, wherein the boot server is a virtual boot server.

21. The system of claim 17, wherein the computer system is implemented as a virtual machine application.

22. The system of claim 21, wherein the virtual machine application and the virtual storage array interface are implemented within a first device at the first network location.

23. The system of claim 17, wherein the storage block cache includes storage blocks prefetched from the physical logical storage device.

24. The system of claim 23, wherein at least a portion of the prefetched storage blocks are retrieved from the physical logical storage device in response to an association between a storage block previously requested by the computer system and the portion of the prefetched storage blocks, wherein the association between the previously requested storage blocks and the portion of the prefetched storage blocks includes at least a first high-level data structure entity.

25. The system of claim 24, wherein the first high-level data structure entity includes a first file used by the initialization process of the computer system.

26. The system of claim 25, wherein the first file is a log file.

27. The system of claim 24, wherein the association includes a second high-level data structure entity referenced by the first high-level data structure entity.

* * * * *